(12) United States Patent
Daishi

(10) Patent No.: US 10,976,590 B2
(45) Date of Patent: Apr. 13, 2021

(54) LIQUID CRYSTAL DISPLAY DEVICE

(71) Applicant: Japan Display Inc., Tokyo (JP)

(72) Inventor: Kazuya Daishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/894,298

(22) Filed: Jun. 5, 2020

(65) Prior Publication Data

US 2020/0387028 A1 Dec. 10, 2020

(30) Foreign Application Priority Data

Jun. 7, 2019 (JP) .............................. JP2019-107084

(51) Int. Cl.
*G02F 1/1339* (2006.01)
*G02F 1/1335* (2006.01)
*G02F 1/1362* (2006.01)

(52) U.S. Cl.
CPC ...... *G02F 1/133512* (2013.01); *G02F 1/1339* (2013.01); *G02F 1/133514* (2013.01); *G02F 1/136286* (2013.01); *G02F 1/13396* (2021.01); *G02F 2201/123* (2013.01)

(58) Field of Classification Search
None
See application file for complete search history.

(56) References Cited

U.S. PATENT DOCUMENTS

2017/0068130 A1\* 3/2017 Chen .................... G02F 1/13394
2017/0261796 A1 9/2017 Tamaki
2018/0292704 A1\* 10/2018 Hirosawa .......... G02F 1/133514

FOREIGN PATENT DOCUMENTS

JP 2017-161853 A 9/2017

\* cited by examiner

*Primary Examiner* — James A Dudek
(74) *Attorney, Agent, or Firm* — K&L Gates LLP

(57) ABSTRACT

According to one embodiment, a liquid crystal display device includes a pair of substrates, a light-shielding member provided to define pixels, a liquid crystal layer located between the pair of substrates, and a spacer provided to form a gap for the liquid crystal layer. The light-shielding member includes first and second light-shielding members extending in a second direction, and a third light-shielding member extending in a first direction. The first light-shielding member includes a first end portion connected to the third light-shielding member. The second light-shielding member includes a second end portion connected to the third light-shielding member. The spacer is provided at a position overlapping the first end portion and the second end portion.

17 Claims, 12 Drawing Sheets

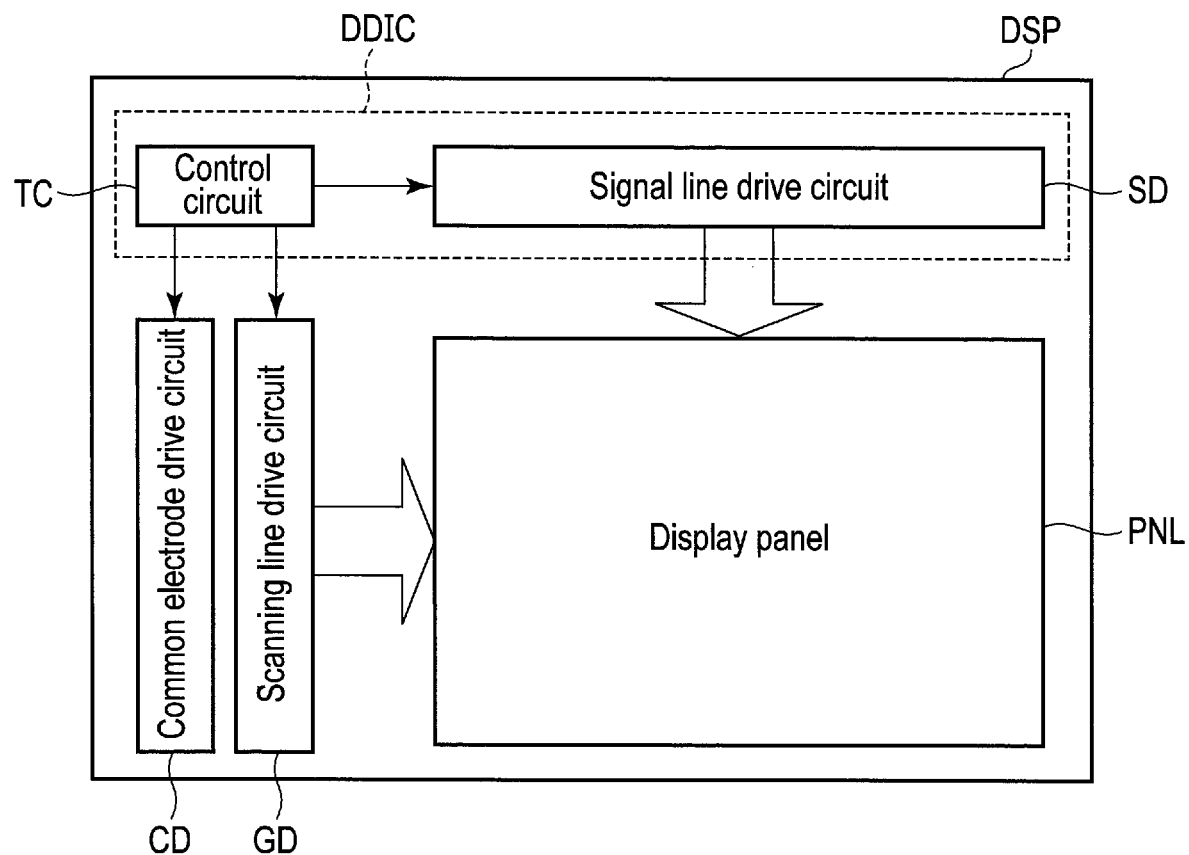
F I G. 1

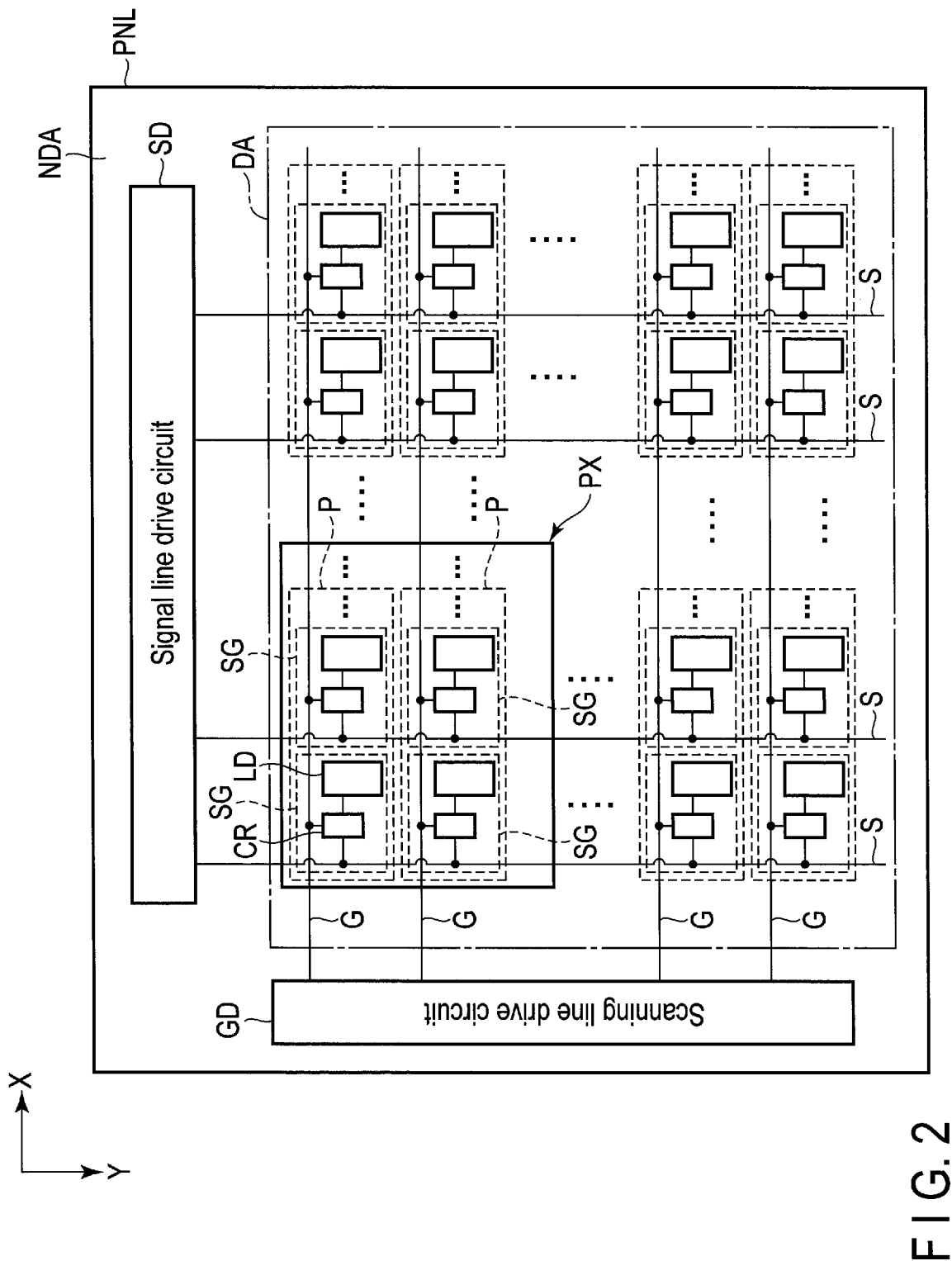
F I G. 2

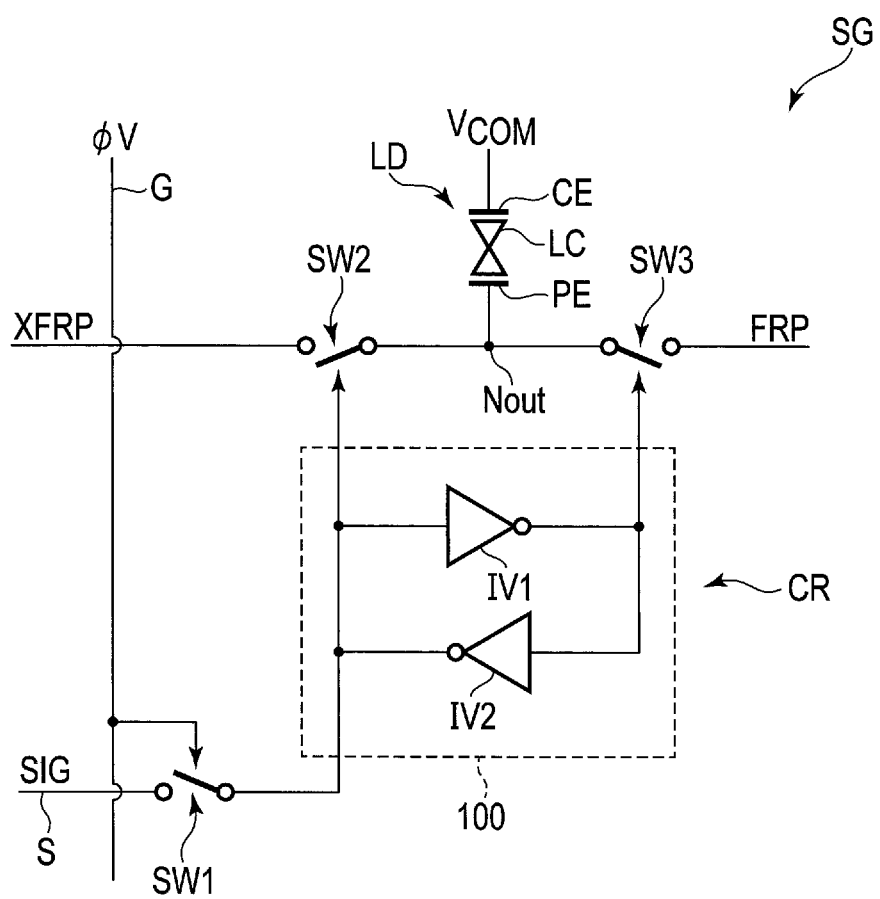
F I G. 3

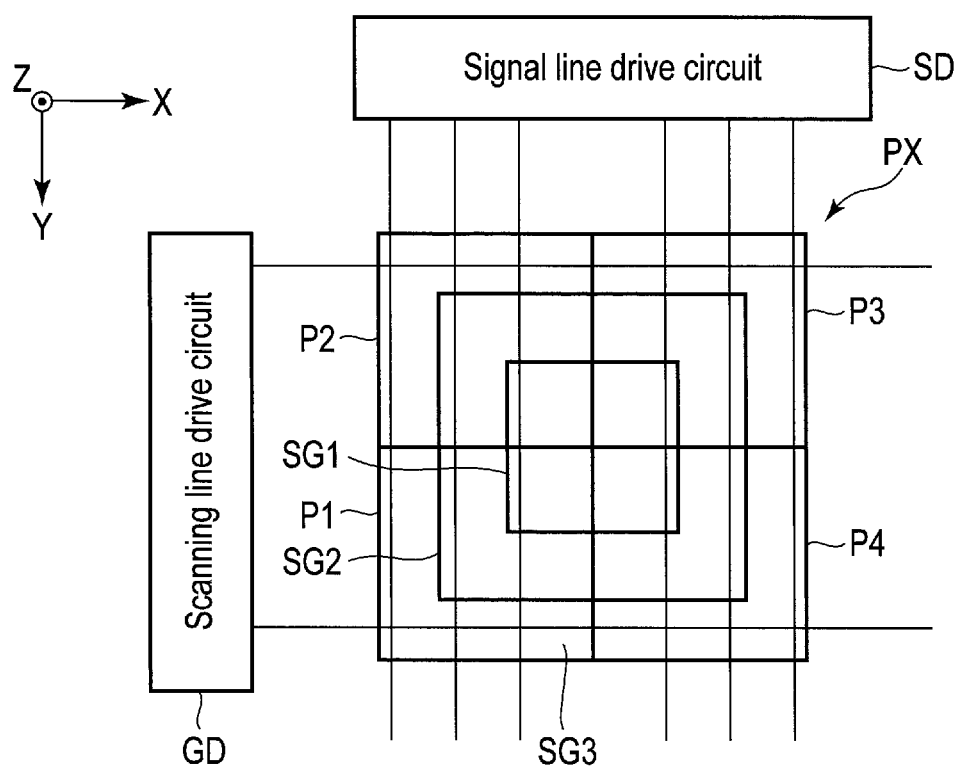
F I G. 4
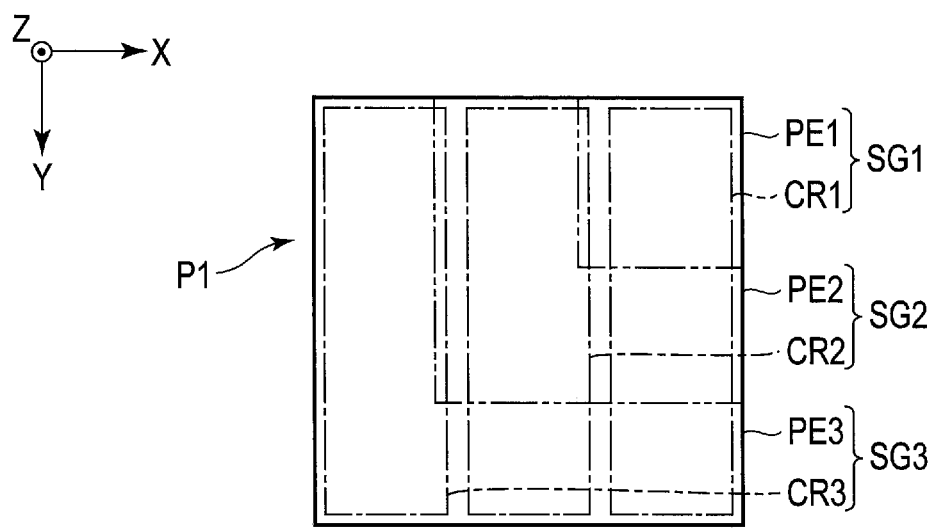
F I G. 5

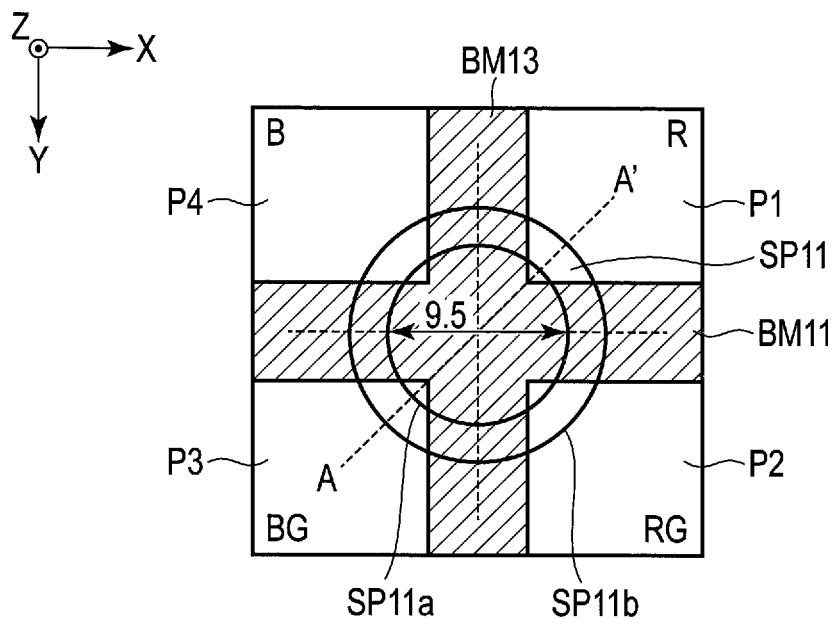
F I G. 7
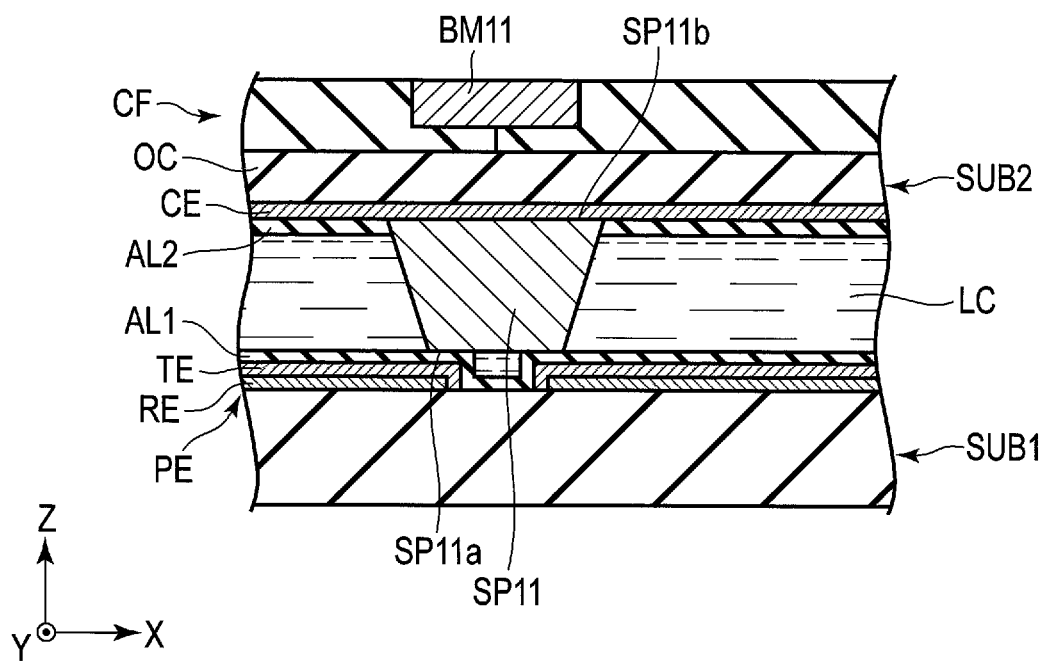
F I G. 8

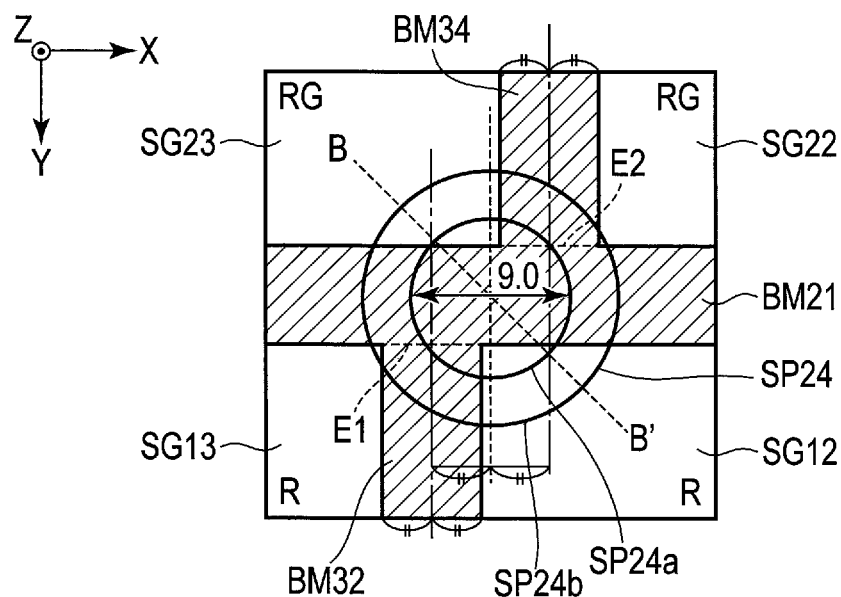
F I G. 9
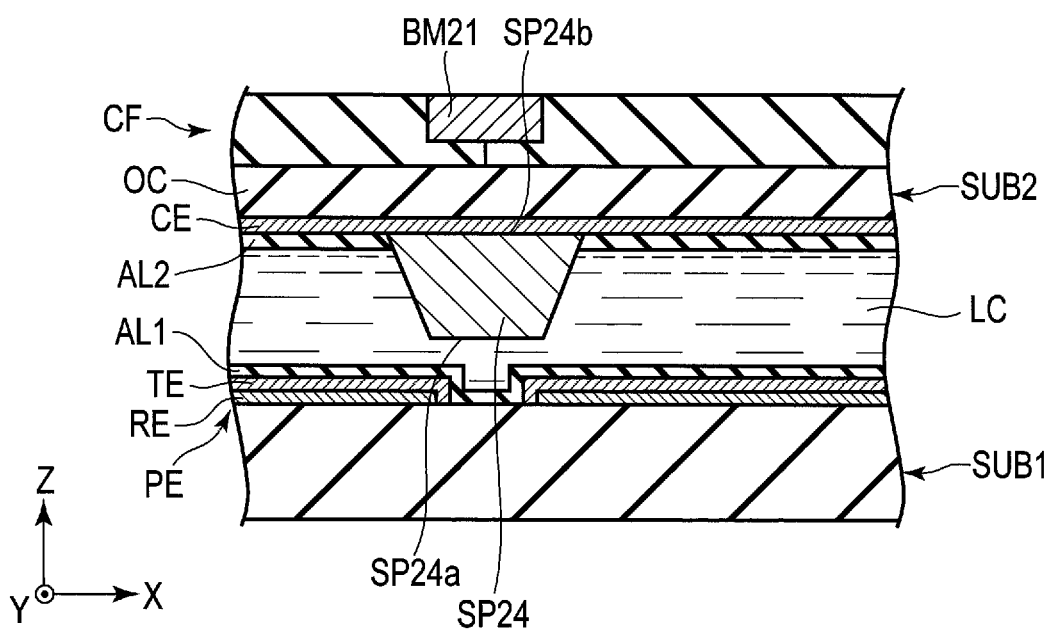
F I G. 10

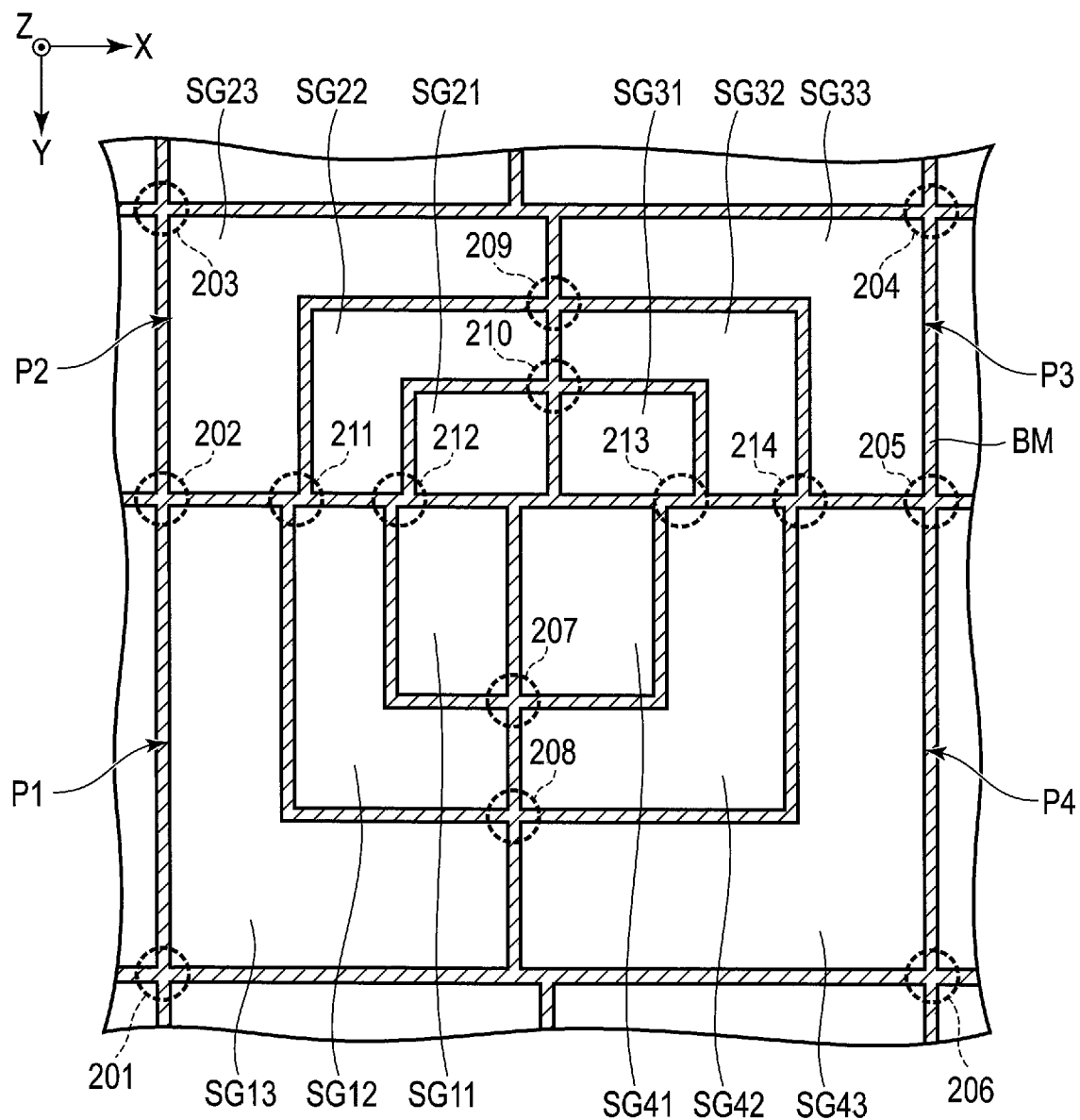
F I G. 12

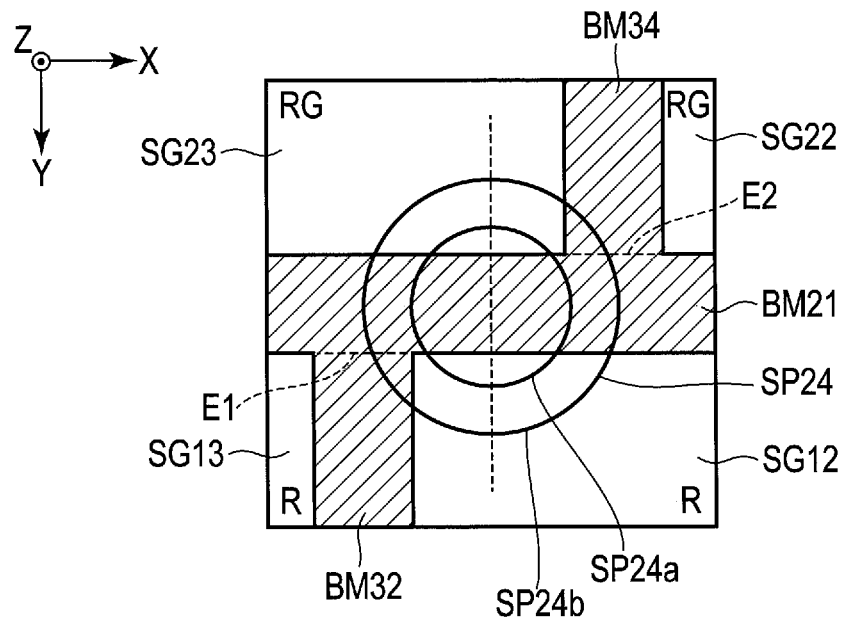
F I G. 15
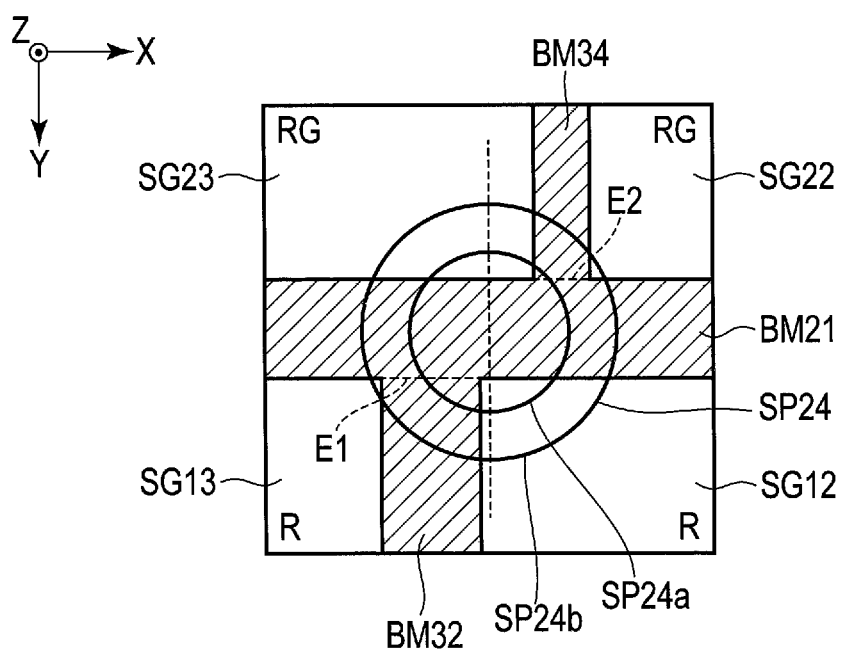
F I G. 16

LIQUID CRYSTAL DISPLAY DEVICE

CROSS-REFERENCE TO RELATED APPLICATIONS

This application is based upon and claims the benefit of priority from Japanese Patent Application No. 2019-107084, filed Jun. 7, 2019, the entire contents of which are incorporated herein by reference.

FIELD

Embodiments described herein relate generally to a liquid crystal display device and a color filter substrate.

BACKGROUND

In a liquid crystal display device, a spacer is provided to hold a gap forming a liquid crystal layer. The spacer should be provided at an appropriate position to prevent gap abnormality.

In recent years, in the liquid crystal display device, the high definition of the display area has been developed. Although the pixel width and the pixel pitch have become narrow, the spacer needs to maintain a predetermined size. The layout of the spacer could more affect on the display quality than ever.

SUMMARY

The present disclosure relates generally to a liquid crystal display device and a color filter substrate.

According to an embodiment, a liquid crystal display device includes a pair of substrates, a light-shielding member provided to define pixels, a liquid crystal layer located between the pair of substrates, and a spacer provided to form a gap for the liquid crystal layer. The light-shielding member includes first and second light-shielding members extending in a second direction, and a third light-shielding member extending in a first direction. The first light-shielding member includes a first end portion connected to the third light-shielding member. The second light-shielding member includes a second end portion connected to the third light-shielding member. The spacer is provided at a position overlapping the first end portion and the second end portion.

BRIEF DESCRIPTION OF THE DRAWINGS

FIG. 1 is a diagram showing the general structure of a liquid crystal display device according to an embodiment.

FIG. 2 is a diagram shown for explaining an example of the structure of a display panel.

FIG. 3 is a diagram showing an example of the structures of a pixel circuit and a liquid crystal element provided in a segment pixel.

FIG. 4 is a diagram shown for explaining the outline of the layout of subpixels and segment pixels.

FIG. 5 is a diagram showing an example of the layout of the pixel circuit.

FIG. 7 is an enlarged view of a main spacer.

FIG. 8 is a cross-sectional view of the main spacer.

FIG. 9 is an enlarged view of a sub-spacer.

FIG. 10 is a cross-sectional view of the sub-spacer.

FIG. 12 is a diagram showing an example in which the black matrices are provided so as to form a crank shape.

FIG. 15 is a diagram showing another example of the positional relationship between the sub-spacer and the crank portion.

FIG. 16 is a diagram showing another example of the positional relationship between the sub-spacer and the crank portion.

DETAILED DESCRIPTION

Figure 6:
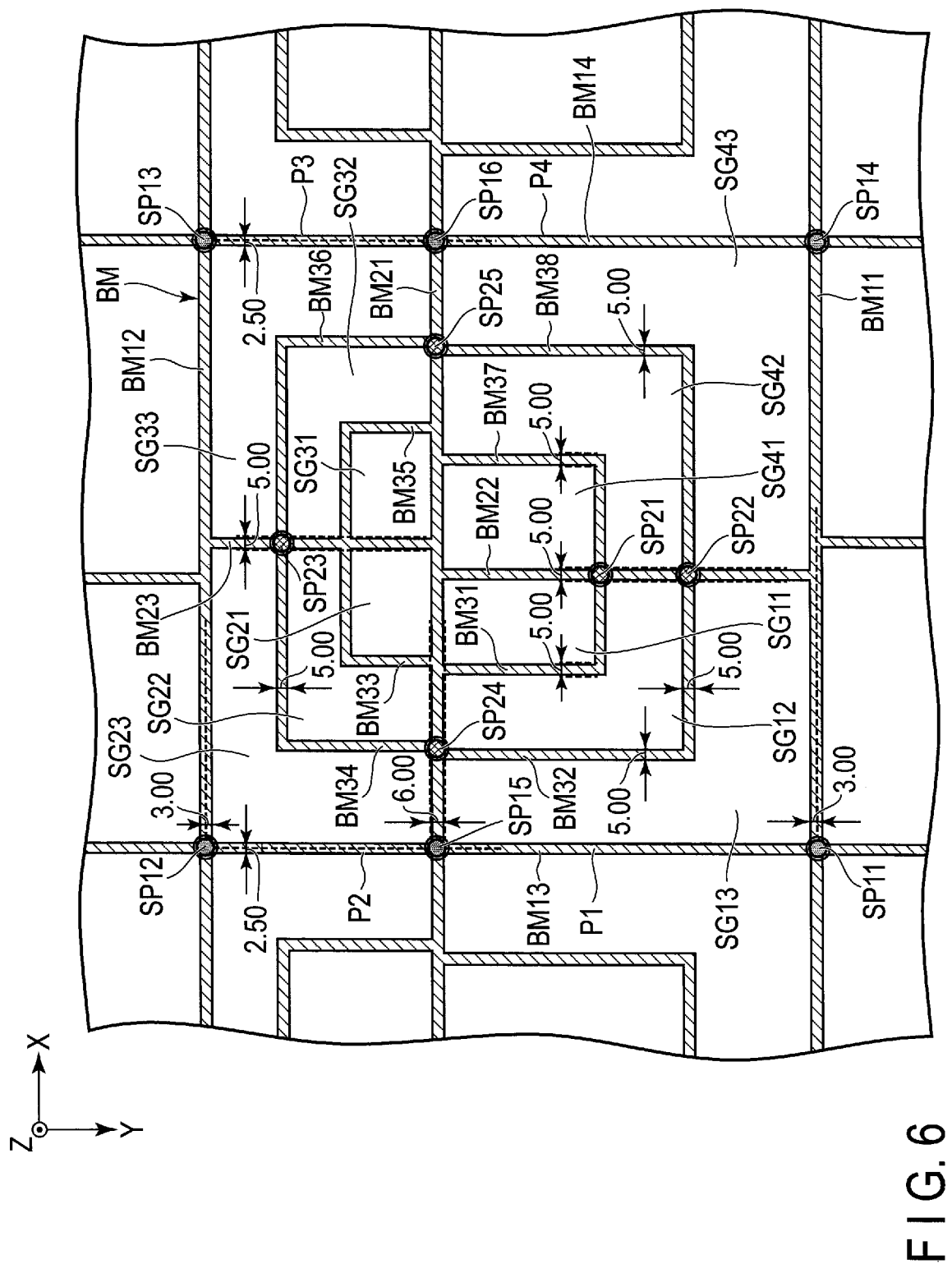
FIG. 6 is a diagram shown for specifically explaining a layout example of spacers in the liquid crystal display device.

In general, according to one embodiment, a liquid crystal display device includes a pair of substrates including a display area in which a plurality of pixels are provided, a light-shielding member provided to define the pixels, a liquid crystal layer located between the pair of substrates, and a spacer provided between the pair of substrates to form a gap for the liquid crystal layer. The light-shielding member includes first and second light-shielding members extending in a second direction intersecting a first direction as seen in plan view, and a third light-shielding member extending in the first direction. The first light-shielding member includes a first end portion connected to the third light-shielding member. The second light-shielding member includes a second end portion connected to the third light-shielding member, and extends in a direction opposite to the first light-shielding member as seen in plan view. The spacer is provided at a position overlapping the first end portion and the second end portion as seen in plan view.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

FIG. 1 shows the general structure of a liquid crystal display device DSP according to the present embodiment. The liquid crystal display device DSP of the present embodiment may be applied to various devices such as a smartphone, a tablet, a mobile phone, a personal computer, a television receiver, a vehicle-mounted device and a game console.

The liquid crystal display device DSP includes a display panel PNL including a pair of substrates. In the liquid crystal display device DSP, a liquid crystal layer is provided between the pair of substrates.

The display panel PNL includes a display area which displays an image, and a non-display area which has a frame shape and surrounds the display area (in other words, an area located around the display area). In the display area of the display panel PNL, for example, a plurality of pixels are provided in matrix. Each pixel includes a switching element. For the switching element, a thin-film transistor (TFT) is used. The structure of the display panel PNL is described later.

The liquid crystal display device DSP further includes a signal line drive circuit SD, a scanning line drive circuit GD, a common electrode drive circuit CD and a control circuit (timing controller) TC.

The signal line drive circuit SD is electrically connected to the source electrode of the switching element included in each pixel via a signal line (source line).

The scanning line drive circuit GD is electrically connected to the gate electrode of the switching element included in each pixel via a scanning line (gate line).

The drain electrode of the switching element included in each pixel is electrically connected to a memory as described later.

The common electrode drive circuit CD is electrically connected to a common electrode facing the pixel electrodes via an insulating film.

The control circuit TC generates various timing signals for driving the signal line drive circuit SD, the scanning line drive circuit GD and the common electrode drive circuit CD. The control circuit TC is accommodated in a DDIC together with the signal line drive circuit SD.

In the liquid crystal display device DSP, an image can be displayed in the display area provided in the display panel PNL when the signal line drive circuit SD, the scanning line drive circuit GD and the common electrode drive circuit CD are driven based on a timing signal from the control circuit TC.

In FIG. 1, for convenience sake, the signal line drive circuit SD, the scanning line drive circuit GD, the common electrode drive circuit CD and the control circuit TC are provided outside the display panel PNL. However, for example, these circuits may be provided on the display panel PNL. The display panel PNL is connected to an external device such as a CPU via a flexible printed circuit. The above circuits may be provided on the flexible printed circuit.

Now, this specification explains an example of the structure of the display panel PNL with reference to FIG. 2. In the example of FIG. 2, the above signal line drive circuit SD and scanning line drive circuit GD are provided on the display panel PNL. In FIG. 2, the common electrode drive circuit CD and the control circuit TC are omitted.

The display panel PNL includes the display area DA which displays an image, and the non-display area NDA which surrounds the display area DA as described above. In the display area DA, the display panel PNL includes signal lines S, scanning lines G, pixels PX, conductive lines and power lines (not shown) for transmitting various voltages, etc.

The pixels (unit pixels) PX are regularly arrayed on an X-Y plane defined by a first direction X and a second direction Y. Each pixel PX is a minimum unit constituting a color image. Each pixel PX includes a plurality of subpixels P. Specifically, each pixel PX includes, as subpixels P, for example, a subpixel which displays red (R), a subpixel which displays reddish green (RG), a subpixel which displays bluish green (BG) and a subpixel which displays blue (B). The peak of the spectrum of reddish green and the peak of the spectrum of bluish green have a portion overlapping the peak of the spectrum of light visibly confirmed as green. The spectrum of reddish green is closer to the spectrum of red than the spectrum of bluish green and the spectrum of green. The spectrum of bluish green is closer to the spectrum of blue than the spectrum of reddish green and the spectrum of green.

The colors displayed by a plurality of subpixels P are not limited to these four colors. The subpixels P should at least display different colors. For example, a subpixel which displays red, a subpixel which displays green, a subpixel which displays blue and a subpixel which displays white may be provided.

Further, each subpixel P includes a plurality of segments pixels SG. A signal line S and a scanning line G are connected to each segment pixel SG.

Each segment pixel SG includes a pixel circuit CR and a liquid crystal element LD connected to the pixel circuit CR. Although not shown in FIG. 2, the liquid crystal element LD includes a pixel electrode, a portion of a common electrode provided so as to face the pixel electrode, and a liquid crystal layer located between the pixel electrode and the portion of the common electrode. The pixel electrode is formed at least so as to include a metal layer, and reflects light from outside on the metal layer. The structure of each segment pixel SG is described later.

This display panel PNL displays an image by selectively reflecting incident light from the display surface side (or front surface side of the display panel), such as external light and auxiliary light, on the pixel electrode of each segment pixel SG. The display panel including this type of reflective display function is referred to as a reflective display panel.

The signal lines S are arranged in the first direction X, and are connected to the signal line drive circuit SD. The signal line drive circuit SD outputs, for example, signal potential corresponding to a predetermined gradation, to a corresponding signal line S. Signal potential corresponding to a predetermined gradation is equivalent to a pixel signal (data signal) for displaying an image on the display panel PNL.

The scanning lines G are arranged in the second direction Y intersecting the first direction X, and are connected to the scanning line drive circuit GD. The scanning line drive circuit GD outputs a gate drive signal for controlling the write operation of a pixel signal to each segment pixel SG to a corresponding scanning line G.

The signal line drive circuit SD and the scanning line drive circuit GD are formed in the non-display area NDA of the display panel PNL. However, they may be incorporated into an IC chip mounted on the display panel PNL, or may be formed on the flexible printed circuit connected to the display panel PNL.

In FIG. 2, only one scanning line drive circuit GD is shown. However, the display panel PNL may include a plurality of (for example, two) scanning line drive circuits GD. When two scanning line drive circuits GD are provided, for example, some scanning lines G are connected to one of the scanning line drive circuits GD, and the remaining scanning lines G are connected to the other scanning line drive circuit GD. In this case, the scanning lines G connected to one of the scanning line drive circuits GD may be the scanning lines G of the odd-numbered rows. The remaining scanning lines G connected to the other scanning line drive circuit GD may be the scanning lines G of the evennumbered rows. Further, the scanning line G of the same row may be divided into a scanning line connected to one of the scanning line drive circuits GD and a scanning line connected to the other scanning line drive circuit GD. Two scanning line drive circuits GD may be connected to the same scanning line G. Two scanning line drive circuits GD are provided so as to face each other across the intervening display area DA.

Although omitted in FIG. 2, the display panel PNL may further include a power supply circuit, etc., other than the above signal line drive circuit SD and scanning line drive circuit GD.

FIG. 3 shows an example of the structures of the pixel circuit CR and the liquid crystal element LD provided in each segment pixel SG shown in FIG. 2. The liquid crystal display device DSP of the present embodiment includes a structure employing a memory-in-pixel (MIP) system in which each segment pixel SG includes a memory in which a data signal (pixel signal) can be stored. According to this structure, binary data (a logic "1" or a logic "0") can be stored in the memory of each segment pixel SG, and the on-state and off-state of the segment pixel SG can be realized based on the binary data. A subpixel P is structured by a plurality of segment pixels SG having the same area or different areas. The area of the on-state in the subpixel P is changed by the combination of the on-state and the off-state of the segment pixels SG. The gradation display in each subpixel P is realized by the difference in the area of the on-state. This gradation expression system is also called an area coverage modulation method. The area coverage modulation method is, for example, a gradation expression system in which $2^n$ gradations are expressed by N segment pixels SG in which the area proportions of pixel electrodes are weighted like $2^0, 2^1, 2^2, \ldots, 2^{n-1}$.

The on-state of each segment pixel indicates a state in which the liquid crystal molecules are driven, in other words, a state in which an electric field is generated between the pixel electrode and the common electrode of the liquid crystal layer and the direction of the liquid crystal molecules between the electrodes are changed from the initial alignment state. The display panel of the present embodiment may use a normally black mode, which a non-display or a black-display is presented in the display area when each segment pixel is an off-state, while an image or white-display is presented in the display area when each segment pixel is an on-state.

On the other hand, the display panel of the present embodiment also may use a normally white mode, which a non-display or a white-display is presented in the display area when each segment pixel is an off-state, while an image or black-display is presented in the display area when each segment pixel is an on-state. A white-display state refers to a state in which each segment pixel is bright. Also, when each segment pixel includes a color filter, a white-display state refers to a state in which a predetermined color is displayed via the color filter.

In the case of the liquid crystal display device DSP adopting the above MIP system, the display state of each segment pixel is maintained by a data signal held in the memory. Thus, there is no need to refresh a data signal (signal potential), which reflects the gradation of the segment pixel, in a frame cycle.

In some cases, only a part of the image displayed in the display area DA or a part of the display area is rewritten. In such cases, the data signals of the segment pixels SG may be partially rewritten. In other words, a data signal is output to only the segment pixels SG which should be rewritten. There is no need to output a data signal to the segment pixels SG which should not be rewritten.

Thus, the liquid crystal display device DSP adopting the MIP system has the advantage that reduces the power consumption of the liquid crystal display device DSP.

As described above, each segment pixel SG includes the pixel circuit CR and the liquid crystal element LD. The pixel electrode PE, the common electrode CE and the liquid crystal layer LC shown in FIG. 3 structure the liquid crystal element LD.

The pixel electrode PE is provided in each segment pixel SG, and is electrically connected to a corresponding pixel circuit CR. The common electrode CE faces a plurality of pixel electrodes PE provided in the segment pixels SG. Common voltage Vcom is applied to the common electrode CE by the common electrode drive circuit CD driven based on a COM drive signal. The liquid crystal element LD forms the capacitive component (liquid crystal capacitance) of the liquid crystal layer LC between the pixel electrode PE and the common electrode CE.

The pixel circuit CR includes three switches SW1 to SW3 and the memory (latch) 100. Switch SW1 is structured by, for example, an NchMOS transistor. An end of switch SW1 is connected to the signal line S. The other end of switch SW1 is connected to the memory 100. The on-state and off-state of switch SW1 are controlled by a gate drive signal (control signal) supplied from the scanning line G. Switch SW1 is a switching element which transitions to an on-state when a gate drive signal φV is supplied from the scanning line drive circuit GD via the scanning line G and which loads a data signal SIG (a pixel signal corresponding to gradation) supplied from the signal line drive circuit SD via the signal line S into the memory. The signal line S supplied with a data signal SIG from the signal line drive circuit SD is selected based on a source drive signal input to the signal line drive circuit SD.

The memory 100 includes inverters IV1 and IV2 connected in parallel with each other in opposite directions. In this case, the output terminal of inverter IV1 is connected to the input terminal of inverter IV2, and the output terminal of inverter IV2 is connected to the input terminal of inverter IV1. The nodes of the output terminal side of inverter IV1 and the input terminal side of inverter IV2 are connected to switch SW3. The nodes of the output terminal side of inverter IV2 and the input terminal side of inverter IV1 are connected to switch SW2. Each of inverters IV1 and IV2 is, for example, a CMOS inverter including a plurality of TFTs. In this way, the memory 100 includes an SRAM structure of holding (latching) potential corresponding to the data signal SIG loaded by switch SW1.

Each of switches SW2 and SW3 is structured by, for example, a transfer switch in which an NchMOS transistor and a PchMos transistor are connected in parallel with each other. However, each of switches SW2 and SW3 may be structured by using transistors including other structures.

When common voltage Vcom is alternating voltage, voltage XFRP having a phase opposite to common voltage Vcom is applied to an end of switch SW2, and voltage FRP having the same phase as common voltage Vcom is applied to an end of switch SW3. When common voltage Vcom is direct voltage, alternating voltage XFRP is applied to an end of switch SW2, and the same potential as common voltage Vcom is applied to an end of switch SW3. The other ends of switches SW2 and SW3 are connected to each other, and further, are electrically connected to the pixel electrodes PE, thereby structuring the output node Nout of the pixel circuit CR.

One of switches SW2 and SW3 transitions to an on-state based on the polarity of the holding potential of the memory 100 (in other words, the data signal stored in the memory 100). In this way, voltage FRP having the same phase or voltage XFRP having an opposite phase is applied to each pixel electrode PE in which common voltage Vcom is applied to the common electrode CE.

Now, this specification explains the outline of the layout of the subpixels P and the segment pixels SG included in each pixel PX in the present embodiment with reference to FIG. 4. In FIG. 4, for convenience sake, only one pixel PX is shown.

In FIG. 4, the pixel PX includes four subpixels P1 to P4 having a SQUARE array. Subpixel P1 is, for example, a subpixel which displays red. Subpixel P2 is, for example, a subpixel which displays yellow-green or red-green. Subpixel P3 is, for example, a subpixel which displays blue-green. Subpixel P4 is, for example, a subpixel which displays blue.

Subpixels P1 and P2 are arranged so as to be adjacent to each other in the second direction Y. Subpixels P3 and P4 are arranged so as to be adjacent to each other in the second direction Y. Subpixels P1 and P4 are arranged so as to be adjacent to each other in the first direction X. Further, subpixels P2 and P3 are arranged so as to be adjacent to each other in the first direction X.

The colors displayed by subpixels P1 to P4 are realized by the color filters facing the pixel electrodes PE of subpixels P1 to P4, respectively.

Each of subpixels P1 to P4 includes a plurality of segment pixels SG. Hereinafter, this specification explains an example of the segment pixels SG included in subpixel P1 of subpixels P1 to P4. In the following description in FIG. 4, the shape of each segment pixel is explained. This explanation substantially corresponds to the explanation of the shape of the pixel electrode of each segment pixel.

As shown in FIG. 4, subpixel P1 includes segment pixels SG1 to SG3. Segment pixel SG1 is substantially square (rectangular), and is provided in the corner portion of subpixel P1 formed by the boundary between subpixel P1 and subpixel P2 and the boundary between subpixel P1 and subpixel P4. Segment pixel SG2 has an L-shape, and is provided at a position which is in contact with segment pixel SG1. Segment pixel SG3 has an L-shape, and is provided at a position which is in contact with segment pixel SG2. Subpixel P1 has a rectangular shape formed by combining the above segment pixels SG1 to SG3. The shapes of segment pixels SG1 to SG3 may be shapes other than the shapes explained here.

Segment pixels SG1 to SG3 are formed such that, for example, the area ratio is $1:2:4(=2^0:2^1:2^2)$. A small segment pixel SG1 is provided on the center side of the pixel PX. A large segment pixel SG3 is provided on the outer side of the pixel PX. Segment pixel SG2 is provided between segment pixels SG1 and SG3. In the present embodiment, this area ratio is based on the area of a region substantially contributing to display in each segment pixel SG. The area of a region which does not contribute to display, for example, which overlaps a light-shielding member, is not included. The combination of the area proportions of segment pixels SG1 to SG3 is not limited to the above example.

Segment pixel SG1 is a display area corresponding to the least significant bit (for example, $2^0$) in the area coverage modulation of 3-bit. Segment pixel SG3 is a display area corresponding to the most significant bit (for example, $2^2$) in the area coverage modulation of 3-bit. Segment pixel SG2 is a display area corresponding to the middle bit (for example, $2^1$) in the area coverage modulation of 3-bit. The area coverage modulation display of 3-bit can be realized by the combination of segment pixels SG1 to SG3.

Here, subpixel P1 (segment pixels SG1 to SG3) is explained. Each of the other subpixels P2 to P4 also includes three segment pixels SG.

Each of subpixels P1 to P4 is defined by light-shielding members called black matrices. Similarly, each segment pixel SG included in each of subpixels P1 to P4 is defined by black matrices (light-shielding members).

As described above, each segment pixel SG included in each of subpixels P1 to P4 includes the pixel circuit CR and the liquid crystal element LD. Thus, when subpixels P1 to P4 and the segment pixels SG included in each of subpixels P1 to P4 are provided in the pixel PX as shown in FIG. 4, the same number of signal lines S as the number of segment pixels SG provided in the first direction X in the display panel PNL are connected to the signal line drive circuit SD.

For example, in the subpixels P (segment pixels SG) adjacent to each other in the second direction Y, such as subpixels P1 and P2, the signal lines S are shared.

The same number of scanning lines G as the number of subpixels P provided in the second direction Y are connected to the scanning line drive circuit GD.

FIG. 5 shows an example of the layout of the pixel circuit CR provided in each of segment pixels SG1 to SG3 included in, for example, subpixel P1 shown in FIG. 4 (in other words, the area in which pixel circuits CR are provided).

Here, the pixel circuits CR are formed in the areas shown by the dashed lines in FIG. 5. In FIG. 5, pixel circuits CR1 to CR3 are shown.

Pixel circuit CR1 is a pixel circuit provided in segment pixel SG1 included in subpixel P1. Pixel circuit CR2 is a pixel circuit provided in segment pixel SG2 included in subpixel P1. Pixel circuit CR3 is a pixel circuit provided in segment pixel SG3 included in subpixel P1.

Pixel circuits CR1 to CR3 are provided as shown in the layout of FIG. 5. However, segment pixels SG1 to SG3 (pixel electrodes PE1 to PE3) have the shapes shown in FIG. 4 explained above.

The liquid crystal element LD connected to, for example, pixel circuit CR1 (in other words, a region contributing to the display of segment pixel SG1) is provided in an area overlapping segment pixel SG1.

The liquid crystal element LD connected to pixel circuit CR2 (in other words, a region contributing to the display of segment pixel SG2) is provided in an area overlapping segment pixel SG2.

Further, the liquid crystal element LD connected to pixel circuit CR3 (in other words, a region contributing to the display of segment pixel SG3) is provided in an area overlapping segment pixel SG3.

Here, this specification explains only the layout of the pixel circuit CR provided in each of segment pixels SG1 to SG3 included in subpixel P1. The same explanation is applicable to the other subpixels P2 to P4, etc.

As shown in FIG. 2, each of segment pixels SG1 to SG3 includes a single liquid crystal element LD (pixel electrode PE) and a single pixel circuit CR. The pixel circuit CR is arranged side-by-side with other pixel circuits CR, thereby forming a pixel circuit layer. The pixel electrode PE is arranged side-by-side with other pixel electrodes PE, thereby forming a pixel electrode layer. The pixel circuit layer is provided under the pixel electrode layer via a planarizing film layer. In the present embodiment, the liquid crystal display device is not a transmissive liquid crystal display device, and is a reflective liquid crystal display device. Each pixel electrode PE includes a metal layer for reflection as described above. Thus, the pixel circuit layer is covered with the pixel electrode layer through which light does not substantially pass. As a result, a display image is formed by the reflection on the pixel electrodes PE whereas the circuit shape under the pixel electrode layer does not affect display. Thus, the planar shape of each pixel electrode PE in the pixel electrode layer does not need to be the same as the planar shape of each pixel circuit CR of the pixel circuit layer provided under the pixel electrode layer. Respective planar shapes may be adopted as shown in FIG. 5.

More specifically, as shown in FIG. 5, whereas the arrangement and sizes of the pixel electrodes of segment pixels SG1 to SG3 differ depending on the number of bits of area coverage modulation and the definition, the pixel circuits CR have the same planar shape as they have the same structure. In this way, as shown in FIG. 5, three pixel electrodes PE having shapes different from three segment pixels SG1 to SG3 may overlap pixel circuits CR1 to CR3 of segment pixels SG1 to SG3. Further, the areas in which the pixel electrodes of segment pixels SG1 to SG3 are provided are not necessarily the same as the areas in which pixel circuits CR1 to CR3 are provided. For example, they may deviate from each other vertically or horizontally as seen in plan view.

In the liquid crystal display device DSP of the present embodiment, a gap between the pair of substrates is filled with the liquid crystal layer LC. Thus, in the liquid crystal display device DSP, a holding member called spacers needs to be provided between the pair of substrates to keep the gap for the liquid crystal layer LC. The spacers are also used to, for example, equalize the thickness (cell gap) of the liquid crystal layer LC.

In the liquid crystal display device DSP of the present embodiment, the pixels PX, the subpixels P and the segment pixels SG are defined by black matrices. Thus, generally, the spacer is provided at a position overlapping the black matrices as seen in plan view (under the black matrices). Specifically, the spacers are formed of, for example, acrylic resin. As the spacers may affect an image displayed in the display area DA, for example, a spacer should be preferably provided at a position where a black matrix extending in the first direction X intersects a black matrix extending in the second direction Y in a cross shape (in other words, at the center of black matrices intersecting in a cross shape). In the present embodiment, the description "provided at a position where black matrices intersect in a cross shape" indicates that a spacer is provided at a position overlapping an area in which black matrices intersect in a cross shape as seen in plan view. In this structure, a certain reflective area (in other words, a certain aperture ratio contributing to display) in the reflective liquid crystal display device DSP of the present embodiment can be ensured.

In the above FIG. 4, the typical layout example of the subpixels P and the segment pixels SG is explained. In some pixels PX, the area proportions of subpixels P1 to P4 may be changed.

In the case of such a pixel PX, not all of the black matrices BM defining subpixels P1 to P4 and the segment pixels SG constituting each of subpixels P1 to P4 can intersect in a cross shape. Thus, the position at which a spacer is provided is restricted. To appropriately prevent gap abnormality even when, for example, the area proportions of subpixels P1 to P4 of four colors are changed as described above, a spacer needs to be provided at a position other than a portion in which black matrices intersect in a cross shape.

Hereinafter, this specification specifically explains a layout example of spacers in the liquid crystal display device DSP of the present embodiment with reference to FIG. 6. FIG. 6 mainly shows one pixel PX (subpixels P1 to P4) and the positions of spacers provided so as to overlap the pixel PX as seen in plan view.

In the example shown in FIG. 6, the pixel PX includes subpixels P1 to P4. Subpixel P1 is, for example, a subpixel (R) which displays red. Subpixel P2 is, for example, a subpixel (RG) which displays reddish green. Subpixel P3 is, for example, a subpixel (BG) which displays bluish green. Subpixel P4 is, for example, a subpixel (B) which displays blue.

As shown in FIG. 6, subpixel P1 includes segment pixels SG11 to SG13.

Subpixel P2 includes segment pixels SG21 to SG23. Subpixel P3 includes segment pixels SG31 to SG33. Further, subpixel P4 includes segment pixels SG41 to SG43.

The shapes, layout, etc., of segment pixels SG11 to SG13 constituting the above subpixel P1 are explained in the above FIG. 4. Thus, the detailed description thereof is omitted here. The same indication is applicable to segment pixels SG21 to SG23, SG31 to SG33 and SG41 to SG43 constituting subpixels P2 to P4. The shapes and sizes of these segment pixels SG explained in FIG. 6 are equivalent to the shapes and sizes of the pixel electrodes PE in the segment pixels SG.

The pixel PX is defined by black matrices BM (light-shielding members). In the example shown in FIG. 6, the pixel PX is defined by two black matrices BM11 and BM12 extending in the first direction X and two black matrices BM13 and BM14 extending in the second direction Y.

Subpixels P1 to P4 are defined by black matrices BM. In the example shown in FIG. 6, subpixel P1 is defined by black matrices BM11, BM13, BM21 and BM22. Black matrix BM21 is a black matrix extending in the first direction X in the vicinity of the center of the pixel PX. Black matrix BM22 is a black matrix provided in the boundary between subpixels P1 and P4 and extending in the second direction Y.

Subpixel P2 is defined by black matrices BM12, BM13, BM21 and BM23. Black matrix BM23 is a black matrix provided in the boundary between subpixels P2 and P3 and extending in the second direction.

Subpixel P3 is defined by black matrices BM12, BM14, BM21 and BM23. Subpixel P4 is defined by black matrices BM11, BM14, BM21 and BM22.

Further, each of segment pixels SG11 to SG13, segment pixels SG21 to SG23, segment pixels SG31 to SG33 and segment pixels SG41 to SG43 is defined by black matrices BM.

In the example shown in FIG. 6, segment pixel SG11 is defined by black matrices BM21, BM22 and BM31. Segment pixel SG12 is defined by black matrices BM21, BM22, BM31 and BM32. Segment pixel SG13 is defined by black matrices BM11, BM13, BM21, BM22 and BM32. Black matrix BM31 is an L-shaped black matrix provided in the boundary between segment pixels SG11 and SG12. Black matrix BM32 is an L-shaped black matrix provided in the boundary between segment pixels SG12 and SG13.

Segment pixel SG21 is defined by black matrices BM21, BM23 and BM33. Segment pixel SG22 is defined by black matrices BM21, BM23, BM33 and BM34. Segment pixel SG23 is defined by black matrices BM12, BM13, BM21, BM23 and BM34. Black matrix BM33 is an L-shaped black matrix provided in the boundary between segment pixels SG21 and SG22. Black matrix BM34 is an L-shaped black matrix provided in the boundary between segment pixels SG22 and SG23.

Segment pixel SG31 is defined by black matrices BM21, BM23 and BM35. Segment pixel SG32 is defined by black matrices BM21, BM23, BM35 and BM36. Segment pixel SG33 is defined by black matrices BM12, BM14, BM21, BM23 and BM36. Black matrix BM35 is an L-shaped black matrix provided in the boundary between segment pixels SG31 and SG32. Black matrix BM36 is an L-shaped black matrix provided in the boundary between segment pixels SG32 and SG33.

Segment pixel SG41 is defined by black matrices BM21, BM22 and BM37. Segment pixel SG42 is defined by black matrices BM21, BM22, BM37 and BM38. Segment pixel SG43 is defined by black matrices BM11, BM14, BM21, BM22 and BM38. Black matrix BM37 is an L-shaped black matrix provided in the boundary between segment pixels SG41 and SG42. Black matrix BM38 is an L-shaped black matrix provided in the boundary between segment pixels SG42 and SG43.

In the following explanation, it is assumed that the pixel PX, the subpixels P and the segment pixels SG shown in FIG. 6 are defined by black matrices BM11 to BM14, BM21 to BM24 and BM31 to BM38.

In the present embodiment, for example, the lengths of segment pixels SG11 to SG13 constituting subpixel P1 in the second direction Y are equal to the lengths of segment pixels SG41 to SG43 constituting subpixel P4 in the second direction Y, respectively. In this structure, the portion extending in the first direction X in black matrix BM31 having an L-shape and the portion extending in the first direction X in black matrix BM37 having an L-shape are aligned on the same straight line. Similarly, the portion extending in the first direction X in black matrix BM32 having an L-shape and the portion extending in the first direction X in black matrix BM38 having an L-shape are aligned on the same straight line.

In this case, the length of subpixel P1 in the first direction X may be equal to or different from the length of subpixel P4 in the first direction X. The length of subpixel P1 in the first direction X and the length of subpixel P4 in the first direction X may be arbitrarily adjusted depending on the area proportions of subpixels P1 and P4. In the example of FIG. 6, the length of subpixel P1 in the first direction X is different from the length of subpixel P4 in the first direction X.

Similarly, for example, the lengths of segment pixels SG21 to SG23 constituting subpixel P2 in the second direction Y are equal to the lengths of segment pixels SG31 to SG33 constituting subpixel P3 in the second direction Y, respectively. In this structure, the portion extending in the first direction X in black matrix BM33 having an L-shape and the portion extending in the first direction X in black matrix BM35 having an L-shape are aligned on the same straight line. Similarly, the portion extending in the first direction X in black matrix BM34 having an L-shape and the portion extending in the first direction X in black matrix BM36 having an L-shape are aligned on the same straight line.

In this case, the length of subpixel P2 in the first direction X may be equal to or different from the length of subpixel P3 in the first direction X. The length of subpixel P2 in the first direction X and the length of subpixel P3 in the first direction X may be arbitrarily adjusted depending on the area proportions of subpixels P2 and P3. In the example of FIG. 6, the length of subpixel P2 in the first direction X is equal to the length of subpixel P3 in the first direction X.

Further, the area proportions of subpixels P1 to P4 may be adjusted by changing the lengths of subpixels P1 and P4 in the second direction Y and the lengths of subpixels P2 and P3 in the second direction Y.

Here, for convenience sake, only one pixel PX is explained. However, around (on the left, right, upper and lower sides of) the pixel PX, other pixels PX each including subpixels P1 to P4 (segment pixels SG11 to SG13, SG21 to SG23, SG31 to SG33 and SG41 to SG43) such that these pixels are defined by black matrices BM in a manner similar to that of the above pixel PX are provided.

In the present embodiment, as shown in FIG. 6, for example, the lengths of segment pixels SG11 to SG13 constituting subpixel P1 in the first direction X are not equal to the lengths of segment pixels SG21 to SG23 constituting subpixel P2 in the first direction X. Thus, for example, the portion extending in the second direction Y in black matrix BM31 having an L-shape is not provided on the same straight line as the portion extending in the second direction Y in black matrix BM33 having an L-shape. These portions form a crank shape together with a part of black matrix BM21.

Specifically, for example, the portion (first light-shielding member) extending in the second direction Y in black matrix BM31 includes an end portion (first end portion) connected to black matrix BM21 (third light-shielding member). Similarly, the portion (second light-shielding member) extending in the second direction Y in black matrix BM33 having an L-shape includes an end portion (second end portion) connected to black matrix BM21. The portion extending in the second direction Y in black matrix BM31 having an L-shape extends in a direction opposite to the portion extending in the second direction Y in black matrix BM33 having an L-shape across intervening black matrix BM21. The end portion (first end portion) of black matrix BM31 having an L-shape is provided so as not to face the end portion (second end portion) of black matrix BM33 having an L-shape in the second direction Y (in other words, black matrix BM31 having an L-shape is not provided on the same straight line as black matrix BM33 having an L-shape).

In this case, a crank shape indicates a shape formed by the portion extending in the second direction Y in black matrix BM31 having an L-shape, the portion of black matrix BM21 from the end portion of black matrix BM31 having an L-shape to the end portion of black matrix 33 having an L-shape, and the portion extending in the second direction Y in black matrix BM33 having an L-shape.

Similarly, the portion extending in the second direction Y in black matrix BM32 having an L-shape, a part of black matrix BM21 and the portion extending in the second direction Y in black matrix BM34 having an L-shape form a crank shape.

Here, the black matrices BM forming crank shapes spread over subpixels P1 and P2 are explained. However, similarly, the black matrices BM are provided so as to form a crank shape over subpixels P3 and P4.

In the example shown in FIG. 6, similarly, black matrix BM22 provided in the boundary between subpixels P1 and P4, a part of black matrix BM21 and black matrix BM23 provided in the boundary between subpixels P2 and P3 form a crank shape.

In the present embodiment, the black matrices BM provided so as to define the pixel PX and subpixels P1 to P4 are formed such that each portion extending in the first direction X is wider than each portion extending in the second direction Y. Specifically, as shown in FIG. 6, of the black matrices BM provided so as to define the pixel PX and subpixels P1 to P4, the width of the second direction Y of black matrices BM11, BM12 and BM21 extending in the first direction Y is 6.00 μm. The width of the first direction X of black matrices BM13, BM14, BM22 and BM23 extending in the second direction Y is 5.00 μm. In L-shaped black matrices BM31 to BM38 provided in the boundaries between the segments pixels SG, the width of each portion extending in the first direction X is equal to the width of each portion extending in the second direction Y (for example, 5.00 μm).

The width of each black matrix BM explained above is merely an example, and may be changed as needed. The black matrices BM may be formed such that each black matrix BM extending in the second direction Y is wider than each black matrix BM extending in the first direction X.

Now, this specification specifically explains the layout of the spacers when the pixel PX (subpixels P1 to P4) and the black matrices BM are formed as described above.

In the present embodiment, spacers which keep the gap to provide the liquid crystal layer LC between the pair of substrates are provided as described above. The spacers include a main spacer (first holding member) and a sub-spacer (second holding member) used to support the main spacer.

The layout of each main spacer is firstly explained. As described above, each spacer should be preferably provided at a position where a black matrix BM extending in the first direction X intersects a black matrix BM extending in the second direction Y in a cross shape. Thus, for example, each main spacer is provided at a position where the black matrices BM extending in the first direction X and the second direction Y intersect in a cross shape to define the pixel PX and the subpixels P.

In the example shown in FIG. 6, in the pixel PX, as the main spacers, main spacers SP11 to SP16 are provided.

Main spacer SP11 is provided at a position where black matrix BM11 extending in the first direction X to define the pixel PX intersects black matrix BM13 extending in the second direction Y to define the pixel PX.

FIG. 7 is an enlarged view of main spacer SP11 shown in FIG. 6. Main spacer SP11 includes, for example, a lower surface SP11*a* and an upper surface SP11*b* having an area greater than lower surface SP11*a*, and is formed in an inverse tapered shape from upper surface SP11*b* to lower surface SP11*a*. Lower surface SP11*a* and upper surface SP11*b* of main spacer SP11 are substantially circular. For example, the diameter of lower surface SP11*a* is approximately 9.5 μm.

As described above, main spacer SP11 is provided at a position where black matrices BM11 and BM13 intersect in a cross shape. In this case, main spacer SP11 is provided such that the center of main spacer SP11 is matched with the center of the area in which black matrices BM11 and BM13 intersect in a cross shape as seen in plan view (in other words, main spacer SP11 is provided at the center of black matrices BM11 and BM13 intersecting in a cross shape). In this structure, for example, the top surface of main spacer SP11 overlaps each of the four pixels (in other words, subpixels P1 to P4) defined by black matrices BM11 and BM13 intersecting in a cross shape in the same manner as seen in plan view.

FIG. 8 is a cross-sectional view of main spacer SP11 along the A-A' line shown in FIG. 7. As shown in FIG. 8, the liquid crystal display device DSP of the present embodiment includes a first substrate SUB1 and a second substrate SUB2 as a pair of substrates.

The first substrate SUB1 includes, for example, a pixel electrode PE and an alignment film AL1. The pixel electrode PE includes a reflecting electrode RE, and a transparent protection electrode TE stacked on the reflecting electrode RE. The reflecting electrode RE is formed of a metal material such as aluminum or silver having a high reflectance for visible light. The protection electrode TE is formed of a transparent conductive material such as ITO or IZO.

Alignment film AL1 covers the pixel electrode PE and is in contact with a liquid crystal layer LC. Rubbing treatment or alignment treatment such as optical alignment treatment is applied to alignment film AL1.

The second substrate SUB2 includes black matrix BM11, a color filter layer CF, an overcoat layer OC, a common electrode CE, an alignment film AL2, etc.

As stated above, FIG. 8 is a cross-sectional view along the A-A' line shown in FIG. 7. Thus, in FIG. 8, the color filter layer CF located on the left side of black matrix BM11 provided at a position overlapping main spacer SP11 is a color filter for bluish green (BG). The color filter layer CF located on the right side of black matrix BM11 is a color filter for red (R).

The overcoat layer OC covers the color filter layer CF and flattens the surface of the color filter layer CF.

In a manner similar to that of alignment film AL1, rubbing treatment or alignment treatment such as optical alignment treatment is applied to alignment film AL2. The common electrode CE is provided between the overcoat layer OC and alignment film AL2.

As described above, the liquid crystal layer LC is provided between the pair of substrates (first and second substrates SUB1 and SUB2). In the present embodiment, main spacer SP11 has an inverse tapered shape as described above, and is provided at a position overlapping black matrix BM11 so as to hold a gap for forming the liquid crystal layer LC. In this case, lower surface SP11*a* of main spacer SP11 is in contact with, for example, alignment film AL1. Upper surface SP11*b* of main spacer SP11 is in contact with the common electrode CE and the end portions of alignment film AL2.

Here, main spacer SP11 is mainly explained. Main spacers SP12 to SP16 are the same as main spacer SP11 excluding the provided positions (areas).

Main spacer SP12 is provided at a position where black matrix BM12 and black matrix BM13 intersect. Main spacer SP13 is provided at a position where black matrix BM12 and black matrix BM14 intersect. Main spacer SP14 is provided at a position where black matrix BM11 and black matrix BM14 intersect.

Main spacer SP15 is provided at a position where black matrix BM21 and black matrix BM13 intersect. Main spacer SP16 is provided at a position where black matrix BM2[1] and black matrix BM14 intersect.

As described above, each pixel PX includes subpixels P1 to P4 which display different colors. In the present embodiment, the main spacers are provided at positions where the black matrices BM intersect in a cross shape so as to define subpixels P1 to P4 which display four colors (in other words, in the boundary portions of subpixels P1 to P4).

Secondly, this specification explains the layout of sub-spacers. Each main spacer is allowed to stably hold a gap in comparison with each sub-spacer. However, to avoid the defects of air bubbles, etc., the main spacers should be preferably provided in low density.

In consideration of this matter, the main spacers are provided at the positions described above, and sub-spacers are provided in the regions where the main spacers are not provided in the regions where the black matrices BM intersect.

In the example shown in FIG. 6, as the sub-spacers, sub-spacers SP21 to SP23 are provided in the pixel PX.

Sub-spacer SP21 is provided at a position where the portion extending in the first direction X in black matrix BM31 having an L-shape, the portion extending in the first direction X in black matrix BM37 having an L-shape and black matrix BM22 intersect one another.

Sub-spacer SP22 is provided at a position where the portion extending in the first direction X in black matrix BM32 having an L-shape, the portion extending in the first direction X in black matrix BM38 having an L-shape and black matrix BM22 intersect one another.

Sub-spacer SP23 is provided at a position where the portion extending in the first direction X in black matrix BM34 having an L-shape, the portion extending in the first direction X in black matrix BM36 having an L-shape and black matrix BM23 intersect one another.

Other than sub-spacers SP21 to SP23, for example, a sub-spacer may be further provided at a position where the portion extending in the first direction X in black matrix BM33 having an L-shape, the portion extending in the first direction X in black matrix BM35 having an L-shape and black matrix BM23 intersect one another. In this case, at least one of the above sub-spacers SP21 to SP23 may be omitted.

When the spacers (main spacers SP11 to SP16 and sub-spacers SP21 to SP23) are provided at only the positions where the black matrices BM extending in the first direction X intersect the black matrices BM extending in the second direction Y in a cross shape as described above, the number of spaces is insufficient. In this case, there is a possibility that it takes time for the gap to return to a normal state when the screen is pressed, or there is the possibility of gap abnormality in which the gap does not completely return to a normal state.

Therefore, in the present embodiment, a sub-spacer is further provided at a position where a crank shape is formed by black matrices BM as described above (hereinafter, referred to as a crank portion). In the example shown in FIG. 6, sub-spacers SP24 and SP25 are provided.

Sub-spacer SP24 is provided at a crank portion formed by a part of black matrix BM21, the portion extending in the second direction Y in black matrix BM32 having an L-shape and the portion extending in the second direction Y in black matrix BM34 having an L-shape.

When black matrices BM21, BM32 and BM34 form a crank shape as described above, an end portion of black matrix BM32 having an L-shape is connected to black matrix BM21, and an end portion of matrix BM34 having an L-shape is connected to black matrix BM21. In this case, the description "a spacer (for example, a sub-spacer) is provided in a crank portion" indicates that the spacer is provided at a position overlapping an end portion of black matrix BM32 having an L-shape and an end portion of black matrix BM34 having an L-shape as seen in plan view.

FIG. 9 is an enlarged view of sub-spacer SP24 shown in FIG. 6. In a manner similar to that of the above main spacers, sub-spacer SP24 includes, for example, a lower surface SP24a and an upper surface SP24b having an area greater than lower surface SP24a, and is formed in an inverse tapered shape from upper surface SP24b to lower surface SP24a. Lower surface SP24a and upper surface SP24b of sub-spacer SP24 are substantially circular. For example, the diameter of lower surface SP24a is approximately 9.0 µm. It is assumed that the areas of lower surface SP24a and upper surface SP24b of sub-spacer SP24 are formed so as to be, for example, less than those of the above main spacers SP11 to SP16.

As described above, sub-spacer SP24 is provided at a position overlapping end portion E1 of black matrix BM32 having an L-shape and end portion E2 of black matrix BM34 having an L-shape as seen in plan view. In this case, for example, sub-spacer SP24 is provided at a position where the distance in the first direction X from the center of sub-spacer SP24 to the center line of end portion E1 is equal to the distance in the first direction X from the center of spacer SP24 to the center line of end portion E2 as seen in plan view. Sub-spacer SP24 is provided at a position overlapping all the four pixels (here, segment pixels SG12, SG13, SG22 and SG23) defined by black matrices BM21, BM32 and BM34 forming a crank shape as seen in plan view.

In the example shown in FIG. 9, sub-spacer SP24 overlaps segment pixel SG12 and segment pixel SG23 located diagonally to segment pixel SG12 via black matrices BM21, BM32 and BM34 forming a crank shape. In this case, sub-spacer SP24 is provided at a position where the shape and size of the area in which sub-spacer SP24 overlaps segment pixel SG12 are substantially the same as the shape and size of the area in which sub-spacer SP24 overlaps segment pixel SG23. In the case of either a main spacer or a sub-spacer, the description "a spacer overlaps a segment pixel" includes a structure in which the spacer overlaps the pixel electrode of the segment pixel as seen in plan view as a matter of course, and also includes a structure in which the spacer overlaps a portion which does not overlap any black matrix in the color filter (in other words, the spacer overlaps the color filter located in the aperture area of each segment pixel).

Sub-spacer SP24 overlaps segment pixel SG13 and segment pixel SG22 located diagonally to segment pixel SG13 via black matrices BM21, BM32 and BM34 forming a crank shape. In this case, sub-spacer SP24 is provided at a position where the shape and size of the area in which sub-spacer SP24 overlaps segment pixel SG13 are substantially the same as the shape and size of the area in which sub-spacer SP24 overlaps segment pixel SG22.

Here, this specification explains that sub-spacer SP24 overlaps all the four pixels defined by black matrices BM21, BM32 and BM34 forming a crank shape. However, sub-spacer SP24 may be provided at a position overlapping at least two pixels (for example, segment pixels SG12 and SG23 located diagonally to each other) of the four pixels.

Sub-spacer SP24 is provided at a position of the crank shape such that the distance between the center line of black matrix BM32 having an L-shape and the center line of black matrix BM34 having an L-shape described above is less than or equal to a predetermined distance. For this reason, in the example shown in FIG. 6, for example, no sub-spacer is provided in the crank portion formed by a part of black matrix BM21, black matrix BM22 and black matrix BM23.

FIG. 10 is a cross-sectional view of sub-spacer SP24 along the B-B' line shown in FIG. 9. In FIG. 10, the same reference numbers are added to the same portions as the above FIG. 8, detailed description thereof being omitted. Here, portions different from those of FIG. 8 are mainly explained.

Sub-spacer SP24 shown in FIG. 10 includes an inverse tapered shape in a manner similar to that of the above main spacers. However, sub-spacer SP24 is different from the above main spacers in respect that the areas of lower surface SP24a and upper surface SP24b are less, and the length (height) in a third direction Z is less.

Sub-spacer SP24 having this structure is allowed to keep the gap for the liquid crystal layer LC when, for example, the display area (display surface) is pressed. Thus, sub-spacer SP24 is allowed to support the main spacers and contribute to the prevention of gap abnormality.

FIG. 10 is a cross-sectional view taken along the B-B' line shown in FIG. 9. Thus, in FIG. 10, the color filter layer CF located on the left side of black matrix BM21 provided at a position overlapping sub-spacer SP24 is a color filter for reddish green (RG). The color filter layer CF located on the right side of black matrix BM21 is a color filter for red (R).

Here, sub-spacer SP24 is mainly explained. Sub-spacer SP25 is the same as sub-spacer SP24 except for the provided position (area).

Sub-spacer SP25 is provided at a crank portion formed by a part of black matrix BM21 described above, the portion extending in the second direction Y in black matrix BM36 having an L-shape and the portion extending in the second direction Y in black matrix BM38 having an L-shaped.

In FIG. 6, this specification explains that sub-spacers SP24 and SP25 are provided. However, a sub-spacer may be further provided in another crank portion. In this case, at least one of sub-spacers SP24 and SP25 may be omitted.

In the present embodiment, for example, a sub-spacer is provided in the boundary between, of subpixels P1 to P4, subpixels P which display two colors. Further, such a sub-spacer is provided at a position where black matrices BM intersect in a cross shape or in a crank portion formed by black matrices BM.

Thus, each main spacer is provided between different pixels PX so as to overlap four subpixels P between the pixels PX. Each sub-spacer is provided in a pixel PX so as to overlap the subpixels P of two colors in the pixel PX.

In the example shown in FIG. 6, this specification explains that main spacers SP11 to SP16 and sub-spacers SP21 to SP25 are provided. However, for example, the number of main spacers or sub-spacers to be provided or the positions of the main spacers or sub-spacers may be arbitrarily changed based on the design, etc.

As described above, in the present embodiment, the black matrices BM (light-shielding members) which define the pixels PX, the subpixels P and the segment pixels SG are provided so as to form crank shapes. In the crank portions formed by the black matrices BM, spacers are provided. Specifically, in the present embodiment, the black matrices BM include a first black matrix BM (first light-shielding member) and a second black matrix BM (second light-shielding member) extending in the second direction Y as seen in plan view, and a third black matrix BM (third light-shielding member) extending in the first direction X as seen in plan view. The first black matrix BM includes the first end portion connected to the third black matrix BM. The second black matrix BM includes the second end portion connected to the third black matrix BM, and extends in a direction opposite to the first black matrix BM as seen in plan view. A spacer structured as described above is provided at a position overlapping the first end portion and the second end portion. In the present embodiment, gap abnormality can be prevented by providing spacers in crank portions as described above.

Figure 11:
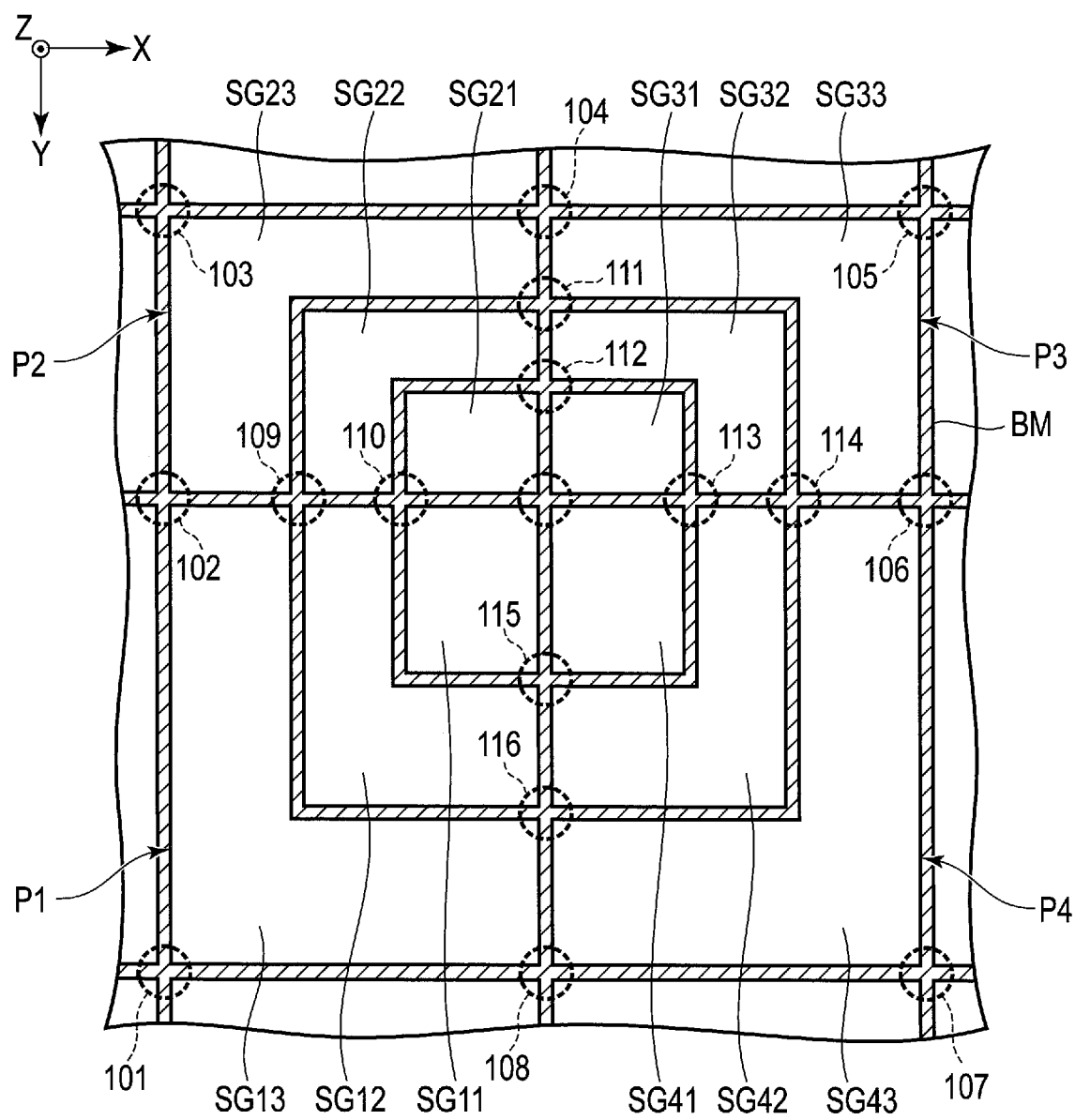
FIG. 11 is a diagram showing an example in which black matrices are provided so as not to form a crank shape.

It is preferable that a spacer should be provided at a position where a black matrix BM extending in the first direction X and a black matrix BM extending in the second direction Y intersect in a cross shape. For example, when subpixels P1 to P4 (segment pixels SG11 to SG13, SG21 to SG23, SG31 to SG33 and SG41 to SG43) are formed so as to be symmetrical about the pixel center line as shown in FIG. 11, spacers may be provided at appropriate positions selected from positions 101 to 116 shown in FIG. 11. Thus, the possibility of gap abnormality is low.

For example, when subpixels P1 to P4 (segment pixels SG11 to SG13, SG21 to SG23, SG31 to SG33 and SG41 to SG43) are structured as shown in FIG. 12 by changing the area proportions of subpixels P1 to P4, the number of portions in which the black matrices BM intersect in a cross shape is less. In this case, if spacers are provided at only the positions where the black matrices BM intersect in a cross shape as described above, the spacers are provided only at positions 201 to 210 shown in FIG. 12, and there is a possibility that the maintenance of a gap against an external force, etc., becomes difficult.

Therefore, in the present embodiment, as described above, spacers are additionally provided in crank portions 211 to 214. By this structure, the area proportions of subpixels P1 to P4 can be flexibly changed, and further, gap abnormality can be prevented. When spacers are provided in crank portions, the reduction in the aperture ratio caused by providing the spacers can be prevented.

When a spacer is provided in a crank portion in the present embodiment, the distance between the first end portion and the second end portion (in the first direction X) in the crank portion (crank shape) is assumed to be less than or equal to a predetermined distance. In this structure, in comparison with the structure in which a spacer is provided in a crank portion where the distance between the first end portion and the second end portion is wide, the spacer can be more appropriately shielded from light by black matrices BM, and the reduction in the aperture ratio can be prevented.

In the present embodiment, the above first black matrix BM and third black matrix BM define, for example, a first segment pixel SG and a second segment pixel SG (a first pixel and a second pixel). The second black matrix BM and the third black matrix BM define, for example, a third segment pixel SG and a fourth segment pixel SG (a third pixel and a fourth pixel). As seen in plan view, a spacer is provided at a position overlapping at least two of the first to fourth segment pixels SG.

In this case, when a spacer is provided at a position overlapping the first segment pixel SG and the fourth segment pixel SG located diagonally to the first segment pixel SG, the spacer is provided such that the shape and size of the area in which the spacer overlaps the first segment pixel SG are substantially the same as the shape and size of the area in which the spacer overlaps the fourth segment pixel SG.

In this structure, a spacer can be provided in the vicinity of the center of a crank portion formed by black matrices BM and can be appropriately shielded from light by the black matrices BM.

A spacer may be provided at a position overlapping all the above first to fourth segment pixels SG. In this case, the spacer should be provided such that the shape and size of the area in which the spacer overlaps the first segment pixel SG are substantially the same as the shape and size of the area in which the spacer overlaps the fourth segment pixel SG, and such that the shape and size of the area in which the spacer overlaps the second segment pixel SG are substantially the same as the shape and size of the area in which the spacer overlaps the third segment pixel SG.

Further, in the present embodiment, a spacer may be provided at a position where the distance from the center of the spacer to the first end portion is equal to the distance from the center of the spacer to the second end portion as seen in plan view. The distance from the center of the spacer to the first end portion may be, for example, either the distance from the center of the spacer to the center line of the first end portion or the distance from the center of the spacer to a predetermined point of the first end portion (for example, the point closest to or farthest from the center of the spacer). The same explanation is applied to the distance from the center of the spacer to the second end portion.

In the present embodiment, a spacer includes, for example, a main spacer (first holding member) and a sub-spacer (second holding member). In the present embodiment, the black matrices BM are formed such that each black matrix BM (each black matrix BM defining the pixels PX and the subpixels P) extending in the first direction X is wider than each black matrix BM extending in the second direction Y. In this case, a portion (crossover portion) intersecting a wide black matrix BM is flatter than a portion intersecting a narrow black matrix BM. Thus, in the present embodiment, a main spacer is provided at a position where a black matrix BM (third light-shielding member) extending in the X direction for defining a pixel PX and subpixels P intersects a black matrix BM (fourth light-shielding member) extending in the second direction Y for defining the pixel PX. In this structure, the main spacer is allowed to stably hold a gap in which the liquid crystal layer LC is formed.

Since a sub-spacer is formed such that the area (diameter) as seen in plan view is less than that of a main spacer, a sub-spacer is provided in a crank portion instead of a main spacer.

In the present embodiment, a main spacer is provided in the boundary portion of four subpixels P which display different colors (in other words, at a position where black matrices BM intersect in a cross shape so as to define subpixels P1 to P4). A sub-spacer is provided in the boundary portion of two subpixels P which display two colors (for example, a crank portion formed so as to spread over subpixels P1 and P2 or subpixels P3 and P4). In the present embodiment, each spacer is stacked on a color filter. The thicknesses of color filters may slightly differ from each other depending on the color. In the present embodiment, each main spacer is provided at a position where four color filters are adjacent to each other, and each sub-spacer is provided at a position where only two colors are adjacent to each other. In other words, every main spacer in the display area has the same base condition. A problem in which the height of the spacer differs depending on the place is not caused. The same explanation is applied to sub-spacers. In other words, in the present embodiment, gap abnormality can be further prevented by providing spacers at positions having the same cross-sectional structure (height direction and stacked film).

In the present embodiment, as shown in, for example, FIG. 9, this specification explains that sub-spacer SP24 is provided in a crank portion where L-shaped black matrices BM32 and BM34 are provided at a position where end portion E1 does not face end portion E2. However, the positional relationship between sub-spacer SP24 and the crank portion may be different from FIG. 9.

Figure 13:
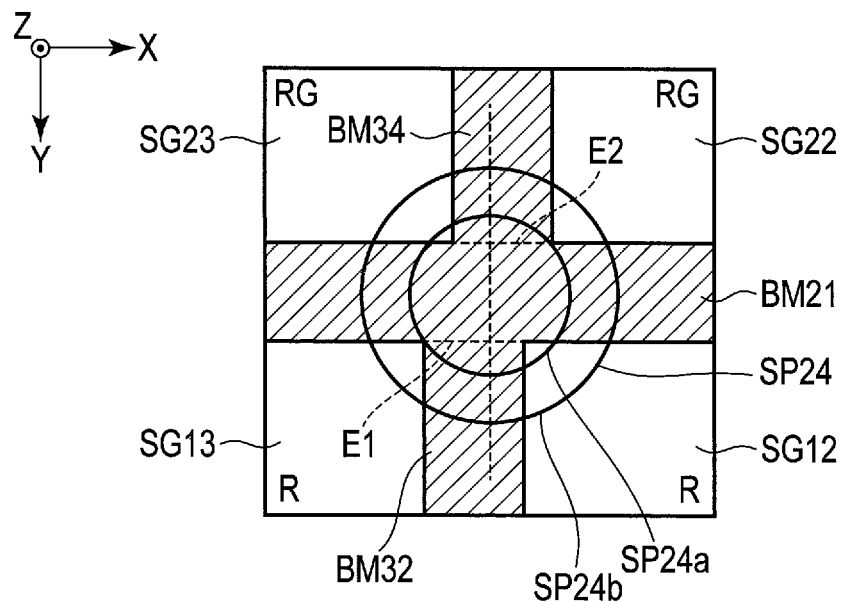
FIG. 13 is a diagram showing another example of the positional relationship between the sub-spacer and a crank portion.
Figure 14:
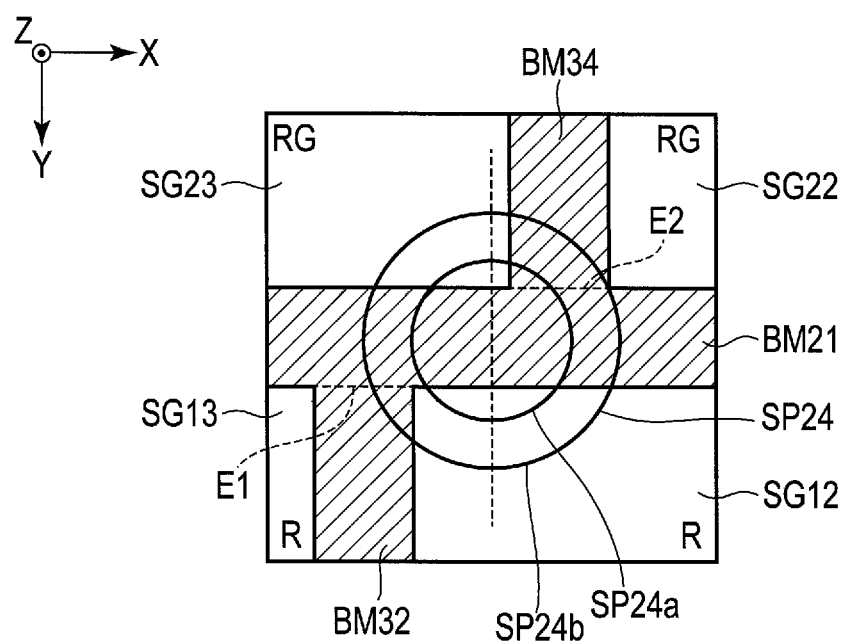
FIG. 14 is a diagram showing another example of the positional relationship between the sub-spacer and the crank portion.

Specifically, as shown in, for example, FIG. 13, sub-spacer SP24 may be provided in a crank portion formed by providing L-shaped black matrices BM32 and BM34 at a position where a part of end portion E1 faces a part of end portion E2 in the second direction Y. Alternatively, as shown in, for example, FIG. 14, sub-spacer SP24 may be provided at a position where end portion E1 of black matrix BM32 having an L-shape overlaps only upper surface SP24*b* of sub-spacer SP24 and where end portion E2 of black matrix BM34 overlaps lower surface SP24*a* and upper surface SP24*b* of sub-spacer SP24.

Moreover, as shown in, for example, FIG. 15, sub-spacer SP24 may be provided at a position where each of end portion E1 of black matrix BM32 having an L-shape and end portion E2 of black matrix BM34 having an L-shape overlaps only upper surface SP24*b* of sub-spacer SP24 (in other words, the area in which sub-spacer SP24 overlaps each of L-shaped black matrices BM32 and BM34 is reduced).

As shown in, for example, FIG. 16, sub-spacer SP24 may be provided in a crank portion formed by L-shaped black matrices BM32 and BM34 having different widths.

Figure 17:
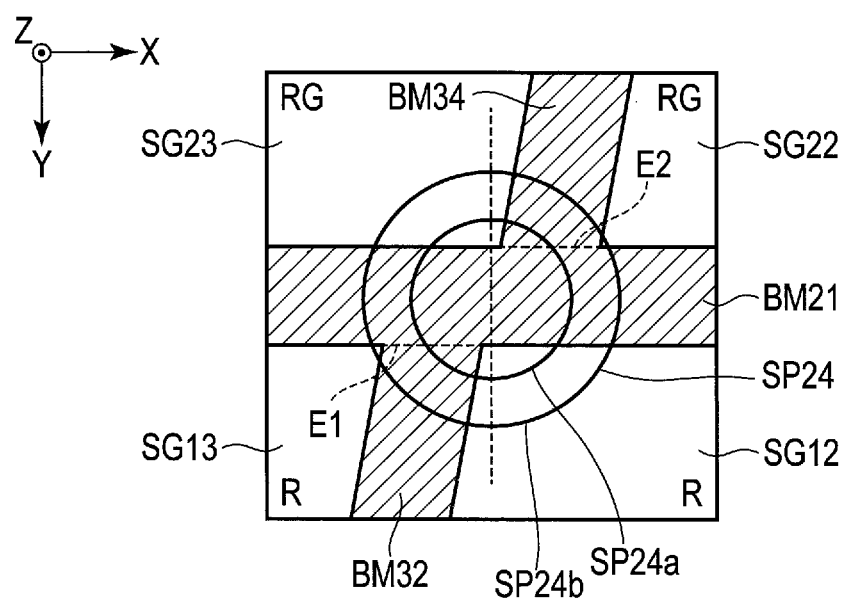
FIG. 17 is a diagram showing another example of the positional relationship between the sub-spacer and the crank portion.

In the above FIG. 9 and FIG. 13 to FIG. 16, this specification explains that L-shaped black matrices BM32 and BM34 extend in a direction (second direction Y) perpendicular to the first direction X in which black matrix BM21 extends. However, as shown in, for example, FIG. 17, L-shaped black matrices BM32 and BM34 may extend in a direction other than a direction perpendicular to the first direction X in which black matrix BM21 extends.

In the above examples, L-shaped black matrices BM32 and BM34 are provided in parallel with each other. However, L-shaped black matrices BM32 and BM34 may not be parallel to each other.

Here, sub-spacer SP24 is mainly explained. The same explanation is applied to the other spacers provided in crank portions. As long as spacers are provided in crank portions formed by black matrices BM, the present embodiment may be realized in various forms with regard to the shapes of the crank portions, the positions of the spacers provided in the crank portions, etc.

In the present embodiment, a liquid crystal display device adopting an MIP system in which each segment pixel SG includes a memory is mainly explained. However, the present embodiment may be applied to another liquid crystal display device which does not adopt the MIP system.

In the present embodiment, it is explained that a black matrix BM is used as a light-shielding member. However, the light-shielding member may be formed by overlapping at least two color filters adjacent to each other. Furthermore, in the present embodiment, a spacer may be formed by stacking a plurality of color filters.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a pair of substrates comprising a display area in which a plurality of pixels are provided;
   a light-shielding member provided to define the pixels;
   a liquid crystal layer located between the pair of substrates; and
   a spacer provided between the pair of substrates to form a gap for the liquid crystal layer, wherein
- the light-shielding member comprises first and second light-shielding members extending in a second direction intersecting a first direction as seen in plan view, and a third light-shielding member extending in the first direction,
- the first light-shielding member comprises a first end portion connected to the third light-shielding member,
- the second light-shielding member comprises a second end portion connected to the third light-shielding member, and extends in a direction opposite to the first light-shielding member as seen in plan view,
- the first light-shielding member and the second light-shielding member are provided at a position where at least part of the first end portion does not face the second end portion in the second direction, and
- the spacer is provided at a position overlapping the first end portion and the second end portion as seen in plan view.

2. The liquid crystal display device of claim 1, wherein the spacer is provided at a position overlapping the first end portion and the second end portion when a distance between the first end portion and the second end portion is less than or equal to a predetermined distance.

3. The liquid crystal display device of claim 1, wherein the first light-shielding member and the third-light shielding member define a first pixel and a second pixel, the second light-shielding member and the third-light shielding member define a third pixel and a fourth pixel, and the spacer is provided at a position overlapping at least two of the first, second, third and fourth pixels as seen in plan view.

4. The liquid crystal display device of claim 3, wherein when the spacer is provided at a position overlapping the first pixel and the fourth pixel, a shape and a size of an area in which the spacer overlaps the first pixel are substantially same as a shape and a size of an area in which the spacer overlaps the fourth pixel.

5. The liquid crystal display device of claim 1, wherein the first light-shielding member and the third light-shielding member define a first pixel and a second pixel, the second light-shielding member and the third light-shielding member define a third pixel and a fourth pixel, and the spacer is provided at a position overlapping all the first, second, third and fourth pixels as seen in plan view.

6. The liquid crystal display device of claim 5, wherein the first pixel is located diagonally to the fourth pixel via the first, second and third light-shielding members, the second pixel is located diagonally to the third pixel via the first, second and third light shielding members, a shape and a size of an area in which the spacer overlaps the first pixel are substantially same as a shape and a size of an area in which the spacer overlaps the fourth pixel, and a shape and a size of an area in which the spacer overlaps the second pixel are substantially same as a shape and a size of an area in which the spacer overlaps the third pixel.

7. The liquid crystal display device of claim 1, wherein the spacer is provided at a position where a distance from a center of the spacer to the first end portion is equal to a distance from the center of the spacer to the second end portion as seen in plan view.

8. The liquid crystal display device of claim 1, wherein the third light-shielding member is formed such that a width of the third light-shielding member in the second direction is greater than a width of the first light-shielding member and a width of the second light-shielding member in the first direction.

9. The liquid crystal display device of claim 1, wherein the light-shielding member further comprises a fourth light-shielding member provided so as to intersect the third light-shielding member, the spacer comprises a first spacer, and a second spacer for supporting the first spacer, the first spacer is provided at a position where the third light-shielding member intersects the fourth light-shielding member as seen in plan view, and the second spacer is provided at a position overlapping the first end portion and the second end portion.

10. The liquid crystal display device of claim 9, wherein the first light-shielding member and the third light-shielding member define two pixels which display a first color, the second light-shielding member and the third light-shielding member define two pixels which display a second color different from the first color, and the third light-shielding member and the fourth light-shielding member define four pixels which display four colors, respectively, including the first and second colors.

11. The liquid crystal display device of claim 1, wherein the spacer comprises a lower surface and an upper surface having an area greater than an area of the lower surface, is formed in an inverse tapered shape from the upper surface to the lower surface, and is provided at a position where, as seen in plan view, the first end portion overlaps the upper surface, and the second end portion overlaps the lower surface and the upper surface.

12. The liquid crystal display device of claim 1, wherein the spacer comprises a lower surface and an upper surface having an area greater than an area of the lower surface, is formed in an inverse tapered shape from the upper surface to the lower surface, and is provided at a position where each of the first and second end portions overlaps the upper surface as seen in plan view.

13. The liquid crystal display device of claim 1, wherein a width of the first light-shielding member in the first direction is different from a width of the second light-shielding member in the first direction.

14. The liquid crystal display device of claim 1, wherein each of the pixels comprises a memory to which a pixel signal for displaying an image in the display area is written.

15. The liquid crystal display device of claim 1, wherein each of the pixels comprises a pixel electrode corresponding to an aperture area defined by the light-shielding member.

16. The liquid crystal display device of claim 15, wherein the pixel electrode comprises a metal layer having light reflectivity.

17. A color filter substrate comprising:
a substrate;
a lattice-shaped light-shielding member formed so as to have a plurality of aperture areas on the substrate;
a color filter provided over the light-shielding member and the aperture areas; and a spacer which at least partially overlaps a light-shielding layer via the color filter, wherein the light-shielding member comprises first and second light-shielding members extending in a second direction intersecting a first direction as seen in plan view, and a third light-shielding member extending in the first direction, the first light-shielding member comprises a first end portion connected to the third light-shielding member, the second light-shielding member comprises a second end portion connected to the third light-shielding member, and extends in a direction opposite to the first light-shielding member as seen in plan view, the first light-shielding member and the second light-shielding member are provided at a position where at least part of the first end portion does not face the second end portion in the second direction, and the spacer is provided at a position overlapping the first and second end portions as seen in plan view.

* * * * *